United States Patent [19]

Fullenkamp et al.

[11] Patent Number: 4,523,683

[45] Date of Patent: Jun. 18, 1985

[54] MEDICAL SERVICE COLUMN AND MOUNTING BRACKET

[75] Inventors: Eugene H. Fullenkamp, Batesville; Cecil R. Lohrey, Brookville, both of Ind.

[73] Assignee: Hill-Rom Company, Inc., Batesville, Ind.

[21] Appl. No.: 462,682

[22] Filed: Jan. 31, 1983

[51] Int. Cl.³ ............................................. A47B 47/00
[52] U.S. Cl. .................................. 211/190; 211/13; 211/163; 248/245; 248/297.2
[58] Field of Search ............... 211/193, 207, 190, 189, 211/162, 94, 13, 133; 248/245, 295.1, 297.2; 361/428, 429; 128/906

[56] References Cited

U.S. PATENT DOCUMENTS

| D. 261,804 | 11/1981 | Foster et al. | |
|---|---|---|---|
| 2,336,044 | 12/1943 | Stuart | |
| 2,512,908 | 6/1950 | Arndt | 361/429 X |
| 2,572,617 | 10/1951 | Haury et al. | 361/429 |
| 3,050,194 | 8/1962 | Sinninger | |
| 3,148,311 | 9/1964 | Conway et al. | 361/429 |
| 4,158,511 | 6/1979 | Herbenar | |
| 4,212,445 | 7/1980 | Hagen | 248/245 |

FOREIGN PATENT DOCUMENTS

| 48225 | 3/1982 | European Pat. Off. | |
|---|---|---|---|
| 262559 | 7/1913 | Fed. Rep. of Germany | 248/245 |
| 631300 | 9/1927 | France | 248/245 |
| 976189 | 11/1964 | United Kingdom | |
| 1021879 | 3/1966 | United Kingdom | |
| 1037700 | 8/1966 | United Kingdom | 211/190 |
| 1188743 | 4/1970 | United Kingdom | |
| 1207891 | 10/1970 | United Kingdom | |
| 2082893 | 3/1982 | United Kingdom | |

Primary Examiner—Ramon S. Britts
Assistant Examiner—Blair Johnson
Attorney, Agent, or Firm—Burns, Doane, Swecker & Mathis

[57] ABSTRACT

A free-standing medical service column has front and rear chases with service outlets mounted on at least the front side for connection with fluid and electrical conduits. The column includes vertically extending tracks at each corner, which tracks extend substantially the height of the column. Brackets, holders, and equipment are connected to the tracks by means of locking slide assemblies. Each slide assembly includes a base and a slide element formed of a low-friction material. A screw interconnects the base with the slide element such that rotation of the screw moves the slide toward the base and against the wall of the channel to frictionally secure the slide within the channel. Members secured to the column by means of locking slide elements may also carry a bracket. The bracket includes a plug formed of resilient material, which plug is received in a cylindrical bore of the member. When the bracket is rotated to a desired position of adjustment, the plug is expanded radially outwardly into frictional engagement with a wall of the bore to affix the bracket immovably to the member. The chases are formed entirely of non-flammable material to eliminate the need for enclosing the electrical lines within metal conduits.

8 Claims, 11 Drawing Figures

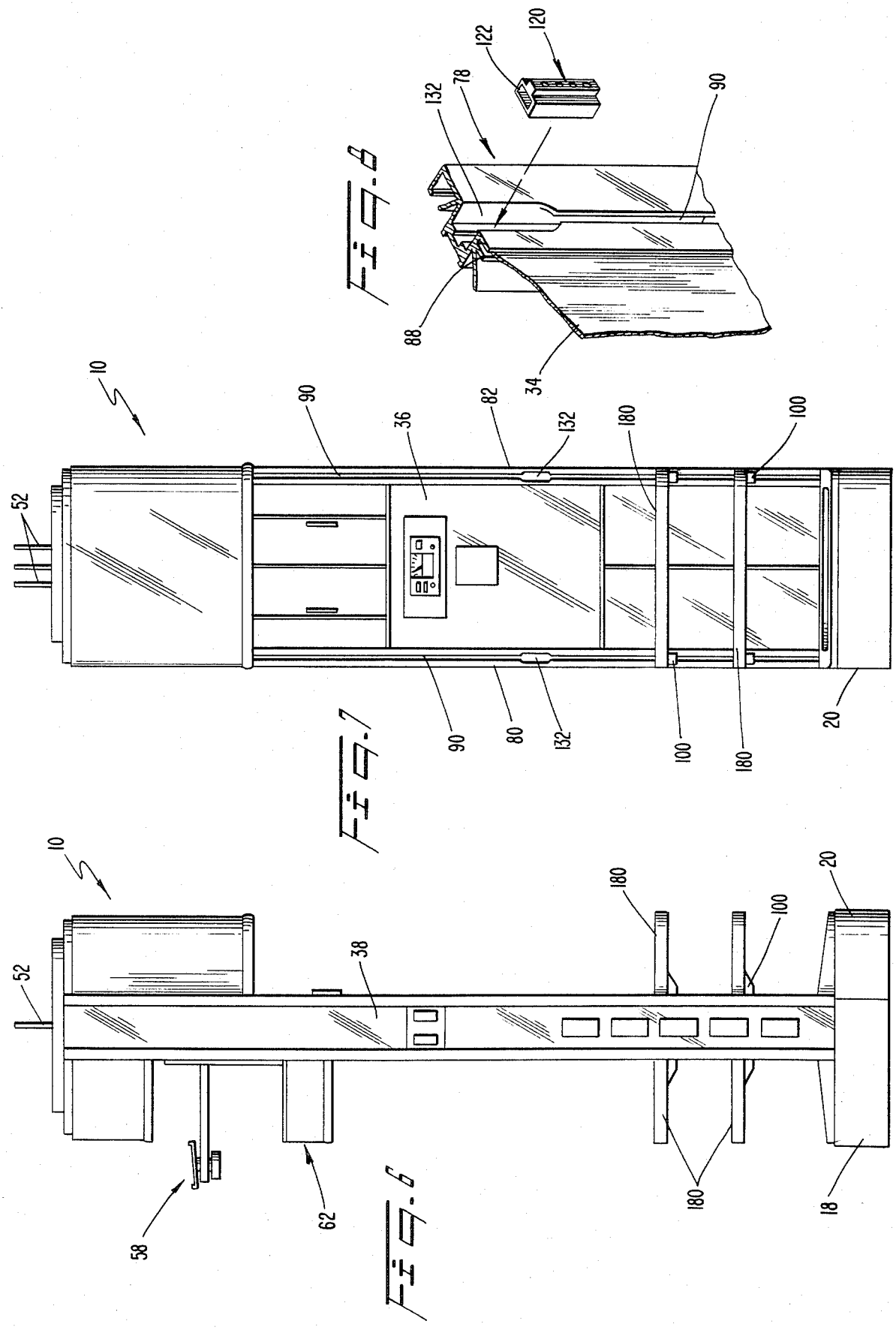

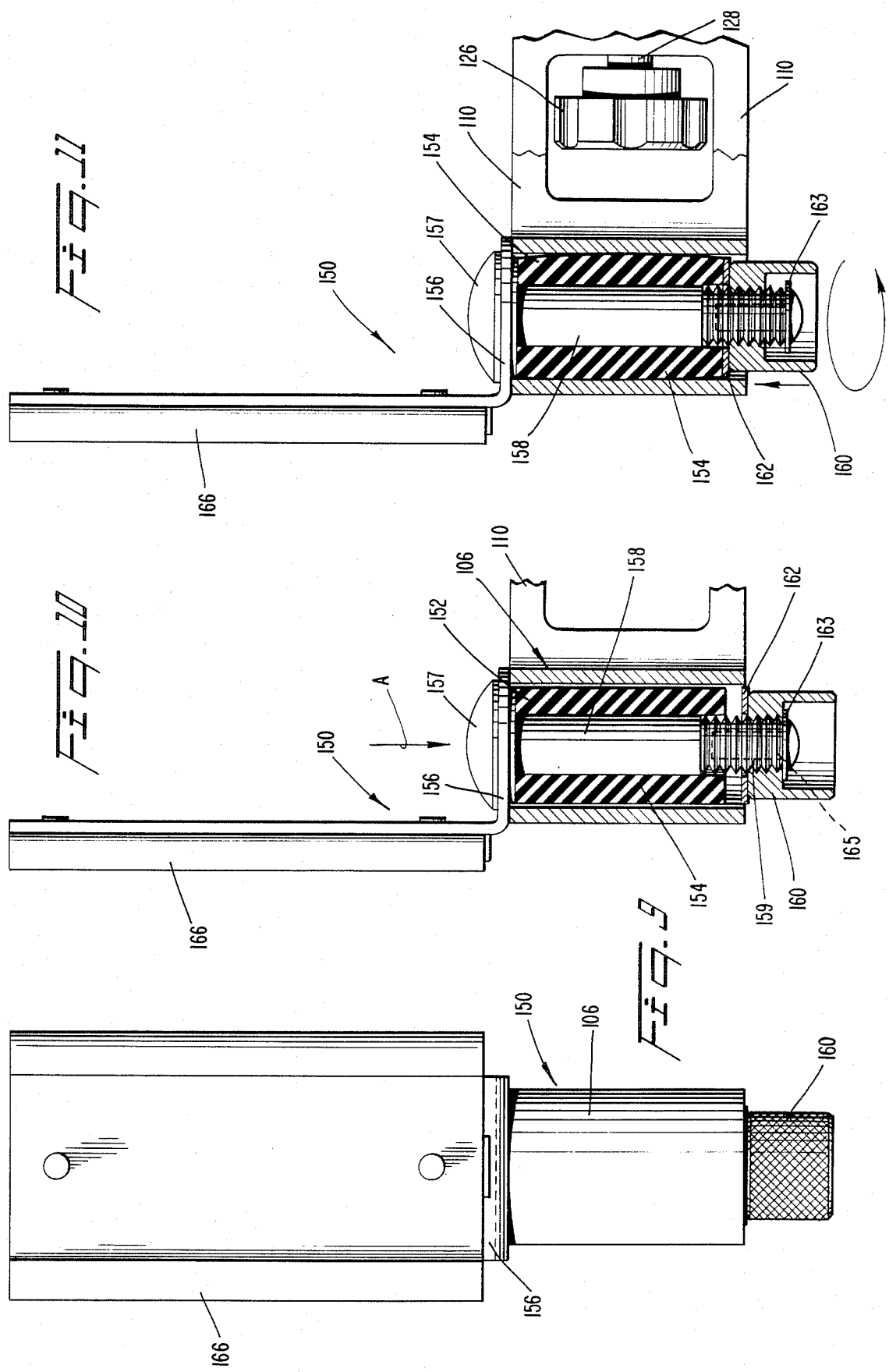

4,523,683

MEDICAL SERVICE COLUMN AND MOUNTING BRACKET

BACKGROUND AND OBJECTS OF THE INVENTION

The present invention relates to the mounting and positioning of equipment, such as medical equipment for example. In particular, one aspect of the invention relates to a free-standing medical care column of the type employed in hospitals for carrying electrical or non-electrical equipment. Another aspect of the invention relates to a mounting bracket which is adjustably positionable along a track.

Free-standing columns are commonly employed in hospital intensive units in close proximity to a patient and are adapted to carry lighting, shelving, etc. One form of such a column is depicted in U.S. Pat. No. Des. 261,804 issued Nov. 10, 1981 to L. D. Foster et al.

Such a free-standing column provides certain advantages over conventional wall mounted systems wherein the equipment and services are mounted on the head wall of the room. With wall mounted systems, there usually results a maze of cords and tubing running between the wall and the patient's bed which can restrict access to the patient and can be inadvertently damaged. Such inconveniences are greatly alleviated by a free-standing column which brings the necessary equipment and serves into the immediate environment of the patient. The column affords a greater degree of access around the patient's bed and permits more efficient delivery of services to the patient.

The column is capable of supporting a wide variety of equipment and services, thereby rendering the column highly versatile, capable of servicing a wide variety of patients' needs. It is desirable, however, that the equipment be capable of convenient and rapid installation and detachment to accommodate emergency situations as well as to avoid interference with patient accessibility. With previous columns the removal and interchanging of equipment was not as convenient and rapid as would be desired in all cases.

It is also desirable to be able to adjustably support certain items or equipment on members other than free-standing columns, e.g., on walls, ceilings or other units. It has also been necessary, in connection with free-standing medical care columns, to provide a series of vertically spaced chases to which the outlets of various service lines, e.g., gas and electric, are connected. The chases are typically comprised of particle board covered by a high pressure laminate. Heretofore, the electrical lines have been extended through metal conduits as a fire safeguard. It would be desirable to eliminate the expense and bulk involved in the provision of those conduits.

It is, therefore, an object of the present invention to minimize or obviate shortcomings previously experienced.

Another object is to provide a novel patient care service column.

A further object is to provide a service column which permits rapid installation and removal of certain pieces of equipment.

Yet another object is to provide a medical service column which eliminates the need for protective metal conduits for the internal electrical wires.

An additional object is to provide a mounting bracket which enables items to be quickly arranged in various positions of vertical and horizontal adjustment.

BRIEF SUMMARY OF THE INVENTION

These objects and advantages are achieved by the present invention which involves a medical service column in combination with a member which is removably attached thereto. The member may comprise a bracket, hanger, or piece of equipment, etc. The column is free-standing and has front and rear sides with service outlets mounted on at least the front side for connection with fluid and electrical conduits. The column is positionable adjacent a corner of the head of the patient's bed to locate medical services proximate to the patient. The column includes pairs of vertically extending tracks at the front and rear sides of the column. Each track extends substantially the height of the column. The member includes at least one locking slide configured to be connected to a track for vertical sliding movement therealong. A manual actuator locks the slide at selected vertical locations along the track.

Preferably, the member includes a base to which the slide is mounted. The slide is formed of a low-friction non-metallic material, such as plastic. A screw interconnects the base with the slide such that rotation of the screw moves the slide toward and away from the base. The slide is configured to slide within a channel of the track and is movable against a wall of the channel when the slide is drawn toward the base by the screw. Preferably, the member may comprise a holder to which a mounting bracket is secured. The mounting bracket has a cylindrical plug formed of resilient material. The member includes a cylindrical bore adapted to receive the plug to enable the latter to be rotated about a longitudinal axis of the bore. A threaded rod and nut are provided for expanding the bore radially outwardly into frictional engagement with a wall of the bore to affix the bracket immovably to the member.

Preferably, the track includes a series of enlarged openings communicating with the channel to enable the slide to be inserted and removed relative to the channel.

Another aspect of the invention relates to the mounting member itself which is suitable for use with suitably anchored tracks, independently of a medical service column.

A further aspect of the invention involves forming the chases or slides of the column entirely of non-flammable materials to eliminate the need to enclose the electrical lines within metal shields or conduits.

THE DRAWINGS

The objects and advantages of the invention will become apparent from the following detailed description of a preferred embodiment thereof, in connection with the accompanying drawings in which like numerals designate like elements, and in which:

FIG. 6 is a side elevational view of the service column;

FIG. 7 is a rear elevational view of the service column;

FIG. 8 is a perspective view of a portion of a track of the service column depicting an enlarged portion of a track channel for receiving a locking slide element;

FIG. 9 is a front elevational view of a holder according to the present invention, with a mounting bracket disposed therein;

FIG. 10 is a side elevational view of the holder, partly in longitudinal section, depicting an expansible, contractable plug of the bracket in a retracted condition; and FIG. 11 is a view similar to FIG. 10, depicting the plug in an expanded condition to secure the bracket to the holder.

DETAILED DESCRIPTION OF A PREFERRED EMBODIMENT OF THE INVENTION

A patient care service column 10 according to the present invention comprises a pair of upstanding support pillars 12, 12A mounted on a support base 16. The base comprises front and rear sections 18, 20 that project laterally outwardly from both sides of a vertical plane containing the two pillars 12, 12A. The column is thus of the free-standing island type.

Figure 3:
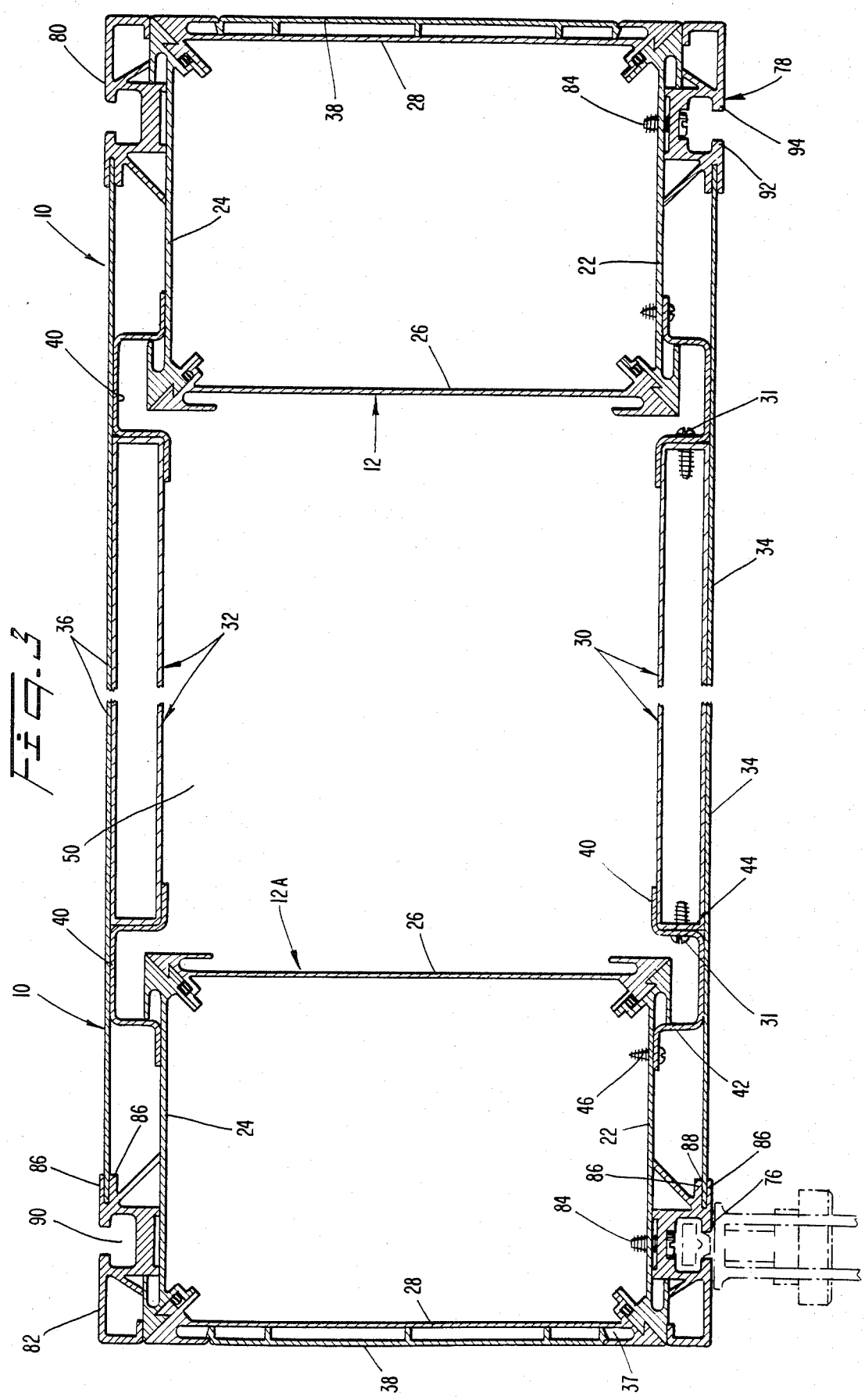
FIG. 3 is a horizontal sectional view taken through the service column along line 3—3 of FIG. 1.
Figure 4:
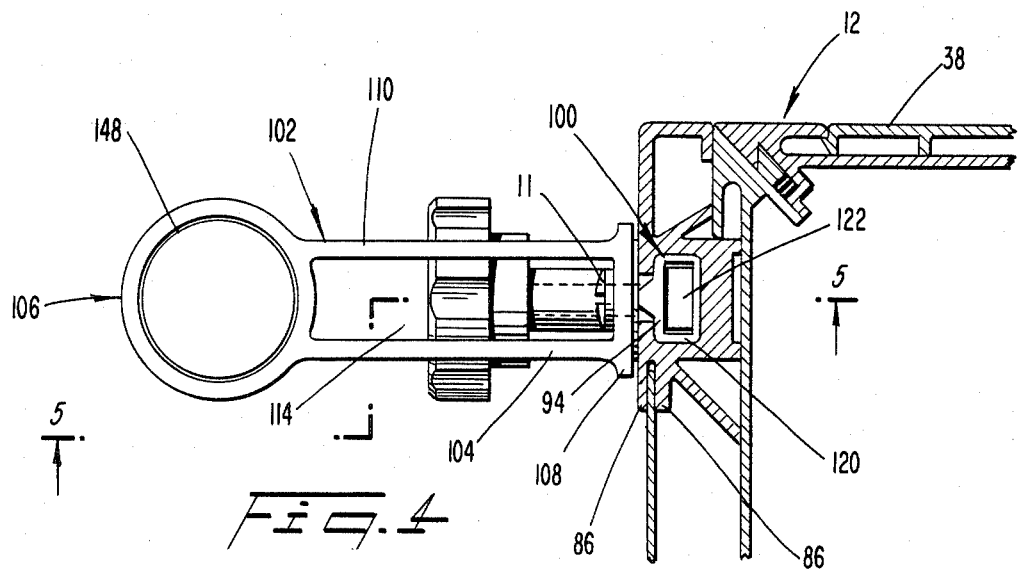
FIG. 4 is a plan view of a holder and locking slide element mounted in a track of the column.
Figure 5:
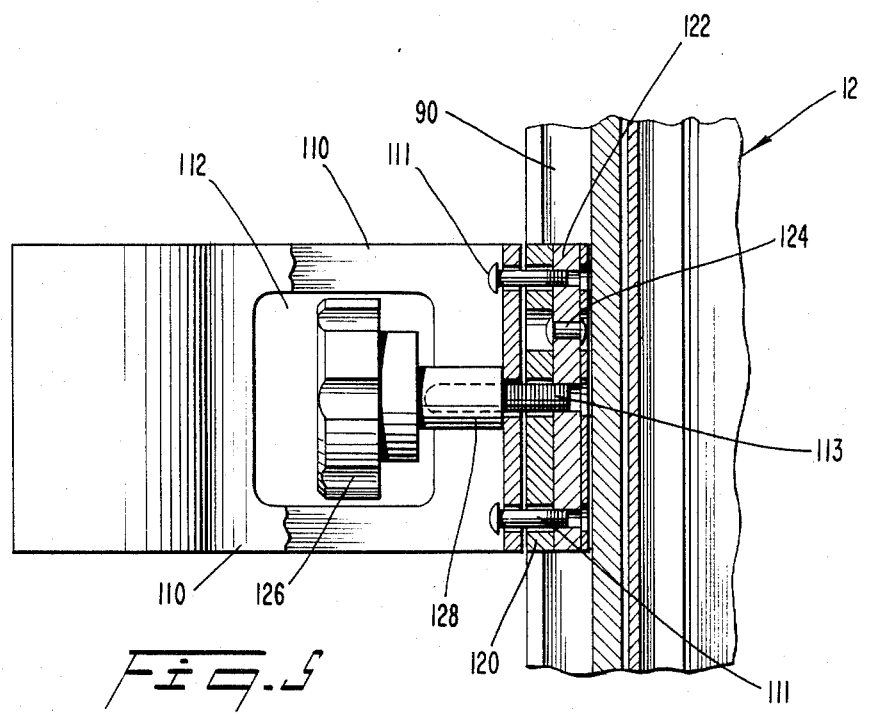
FIG. 5 is a side elevational view, partly in vertical section, of the holder and locking slide.

Each pillar 12, 12A (FIG. 3) comprises front and rear sides 22, 24, an inward side 26, and an outward side 28 which are formed of extruded aluminum walls and suitably fastened together, by interlocking dovetail & filler rod.

Extending across the front of the column, i.e., from the front side of one pillar 12 to the front side of the other pillar 12A are a plurality of horizontal metal plates or chases 30. The chases are vertically spaced and affixed to the pillars at various elevations by means of screw fasteners 31.

A plurality of similar chases 32 extend across the rear side of the column, i.e., from the rear side of one pillar to the rear side of the other pillar.

The front and rear chases are adapted to carry various services for a hospital patient such as outlets for gas, air oxygen, vacuum, telephone and/or electricity (line voltage, low voltage, emergency power, ground, etc.) for example, which is supplied from above (ceiling) or below (floor) via lines disposed interiorly of the column. Outlets can also be mounted along the outward sides 28 of both pillars. The particular provision and arrangement of the outlets will depend in large part upon the particular patient services desired by the hospital.

The chases 30, 32 are covered by sheet metal panels 34, 36, preferably of a decorative nature. The panels contain openings which align with the various outlets to provide access to the latter. Since the chases 30, 32 and panels 34, 36 are formed of a non-flammable material, there is no need to position the electrical lines within metal conduits. This represents substantial savings in labor and materials, as well as in available interior space.

It will be appreciated that, in cross-section, the front and rear walls 22, 24 are of mutually identical configuration as are inward & outward walls 26, 28. The outer wall 28 includes an outwardly facing slot 37 adapted to slidingly receive a decorative side panel 38.

Mounted on the front and rear walls 22, 24 are vertically oriented brackets 40 to which the chases are connected. Each bracket 40 is of generally U-shaped configuration in cross-section, and includes lateral flanges 42, 44. One flange 42 is attached, e.g., by screws 46, to the associated front or rear wall. The other flange 44 is connected to the chases by the screws 31.

Figure 1:
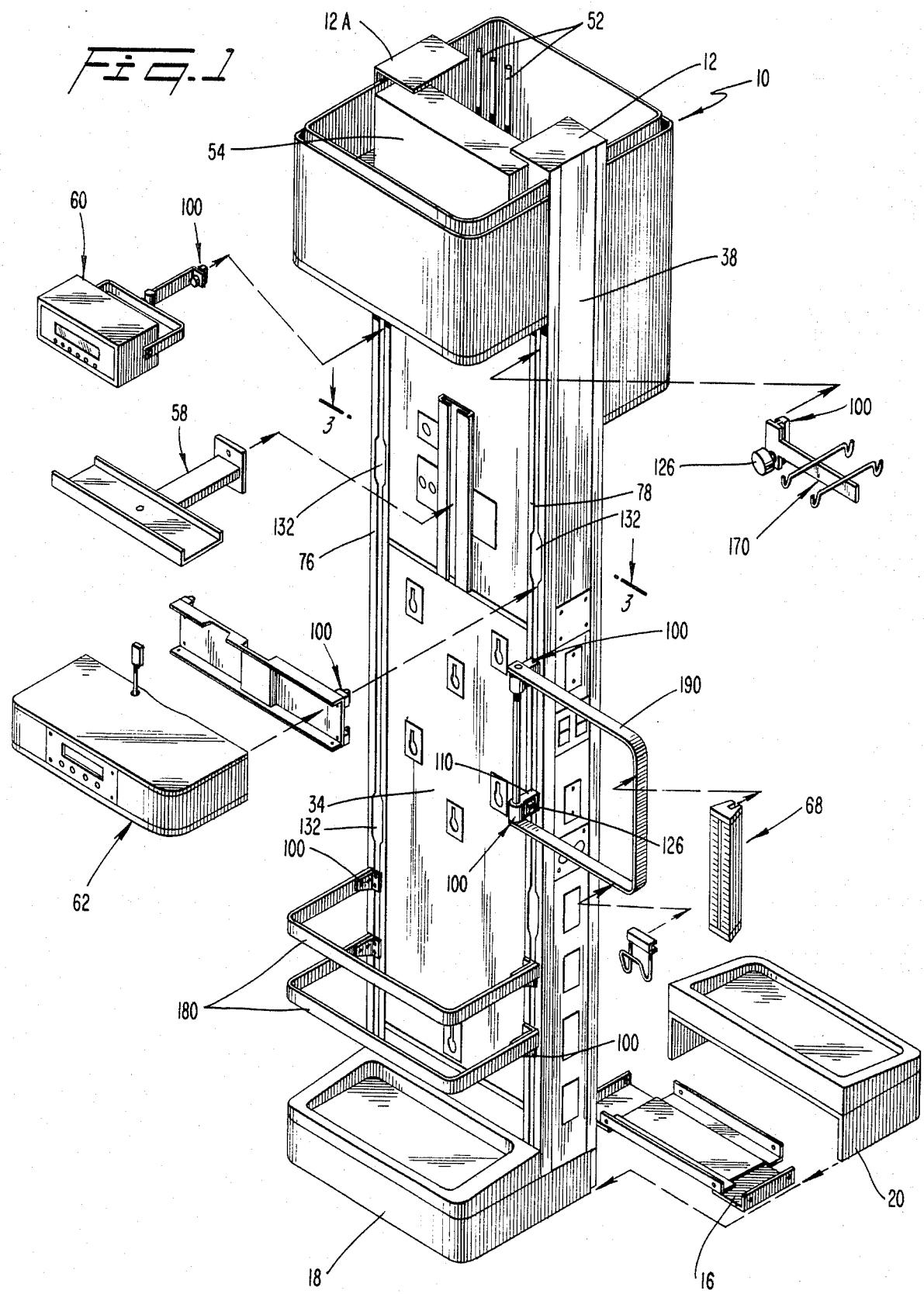
FIG. 1 is a perspective view, mainly from the front, of a free-standing type power column according to the present invention, with a variety of equipment and brackets depicted in exploded relationship.

It will be appreciated that the pillars 12, 12A and chases 30, 32 enclose an interior space 50 through which pass the various fluid and electrical conduits 52 (FIG. 1). Preferably, those conduits extend upwardly through the ceiling and connect with standard fluid and electrical supply lines. The electrical wires are connected to a main junction box 54 disposed at an upper end of the column. This junction box is also connected to the incoming electrical lines. By using a junction box, the column can be prewired, with the final hook-up being made by simply connecting-up the incoming electrical lines to the junction box.

Figure 2:
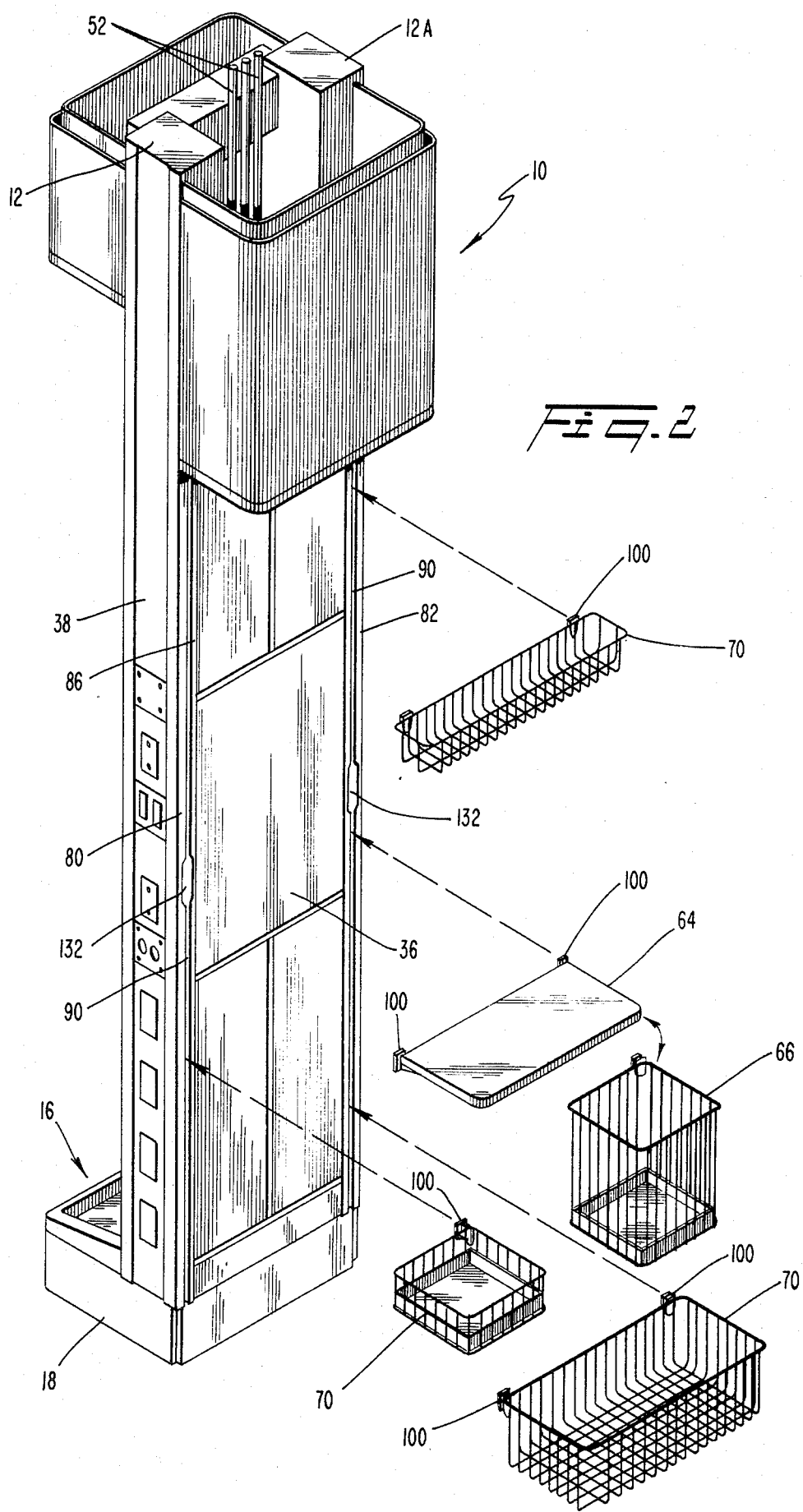
FIG. 2 is a view similar to FIG. 1, taken mainly from the rear of the service column.

In addition to the fluid and electrical services provided from the column, the latter also serves as a support for various pieces of equipment such as, for example, a monitor (not shown, but mountable upon a bracket 58), elapsed time clock 60, lighting 62, suction bottles, nurse call, nurse workshelf 64 (FIG. 2), waste receptacle 66, sphygmomanometer 68, storage containers 70, infusion pump (not shown), etc. It is desirable that some or all of those pieces of equipment be mounted for rapid insertion, removal and/or adjustment of location so as to be adaptable to various patient requirements, especially in emergency situations.

Heretofore, such adaptability was not available, because the various pieces of equipment were attached by screws or by some means of attachment which was not capable of rapid actuation.

In accordance with the present invention, there is provided a track arrangement which affords adjustable mounting of a wide variety of equipment. The track arrangement comprises four vertical tracks 76, 78, 80, 82 which are located at all four corners of the column and which extend the height of the column.

Each track is preferably formed of extruded aluminum and is mounted to a pillar by removable fasteners, such as screws 84. Each track includes flanges 86 which form a vertically oriented, horizontally open slot 88. The tracks are arranged such that the slot of each track faces the slot of the other track on the same side of the column (i.e., front side or back side). The spacing between adjacent slots is dimensioned to enable the edges of the front and rear decorative metal panels 34, 36 to be received in the slots.

Each track also forms a vertical channel 90 which is open outwardly along a portion of reduced width formed by two mutually opposing shoulders 92, 94.

The channel 90 is sized to adjustably receive a holder which is adapted to support an appropriate item. A preferred holder 102 is depicted in FIGS. 4, 5 and 9–11. This holder is suitable for use in connection with any type of track and is not intended solely for use on a medical service column. The holder 102 is adapted to support a piece of equipment, e.g., an infusion pump, for vertical as well as horizontal adjustment. The holder includes a base portion 104 which is to be mounted for sliding movement along a channel 90 of the column, and a socket portion 106 adapted to receive a mounting arm to hold the piece of equipment. The base portion 104 carries a slide lock assembly 100.

The base includes a flange 108 and a pair of plates 110 extending outwardly therefrom. Each plate contains a window 112 which renders accessible the interior space between the plates 114.

Attached to the flange 108 is the slide lock assembly 100 which enables the holder to be secured at different vertical locations along the channel 90. The slide lock assembly 100 comprises a hollow tubular slide element 120 formed of a low-friction material such as plastic. In cross-section, the slide element 120 is slightly smaller than the channel 90 to allow a small degree of movement of the slide element therewithin.

Disposed within the slide element 120 is a rigid insert 122 formed of metal, for example. The slide element is attached to the insert by means of a rivet 124. Connecting the slide element to the flange 108 are a pair of guide screws 111 and an adjustment screw 113. The guide screws 111 extend freely through aligned oversized holes in the flange 108 and slide element 120 and are threadedly received in a threaded hole in the insert 122. The adjustment screw 113 extends through aligned oversized holes in the flange 108 and slide element 120 and is threadedly received in the insert 122. A knob 126 is attached to the adjustment screw 113 and is accessible to manual rotation through the windows 112 of the plates. A plastic spacer 128 is loosely mounted on the adjustment screw and is disposed between the knob and the flange. As the knob 126 and adjustment screw 113 are rotated clockwise, the screw 113 progressively enters the respective hole in the insert 122, and the spacer 128 is drawn toward the flange 108. After the spacer 128 contacts the flange 108, further rotation of the adjustment screw 113 causes the insert 122 and also the slide element 120, to be drawn toward the flange whereupon the slide element contacts the shoulders 92, 94 of the channel 90 to retain the slide element 120, and thus the entire holder 102 at the given elevation along the channel 90. The guide screws 111 guide the slide lock assembly in its movement toward and away from the flange.

When the adjustment screw 113 is rotated in the opposite direction, the slide lock assembly is pushed away from the shoulders 92, 94, permitting the holder to be slid along the channel.

Insertion and removal of the slide lock assembly 100 relative to the channel 90 is provided by one or more entry zones along each track. Those entry zones are in the form of enlargements 132 (FIG. 8) wherein the shoulders 92, 94 are absent. The enlargement 132 is wide enough to admit the slide element 120. Enlargements in adjacent tracks can be disposed at the same elevation to enable horizontal elements with locking slides at opposite ends to be inserted into the tracks.

The socket 106 is formed at the outer ends of the plates and has an open-ended bore 148 extending perpendicularly to the axis of the adjustment screw. A bracket 150 has a tongue 152 which is insertable into the bore 148 in the direction of arrow A in FIG. 10. The tongue includes a hollow cylindrical plug 154 formed of a relatively high friction material, such as rubber for example. The plug 154 is secured to an ear 156 of the bracket 150 by means of a threaded fastener 158. The fastener 158 includes a head 157 and a rod portion which passes through the plug 154. The rod portion is threaded at 159 and receives a threaded nut 160 and washer 162 at its outer end. By tightening the nut 160 and washer 162 against the plug, the latter is compressed axially and expanded radially into engagement with the side wall of the bore. Accordingly, the bracket 150 can be selectively secured within the holder 102. A stop ring 163 can be secured to the fastener by means of a screw 165 to prevent inadvertent loss of the nut 160.

The free end 166 of the bracket can be arranged to receive any appropriate piece of equipment. The piece of equipment can be adjusted vertically along the channel 90 by means of the slide lock assembly 100, and adjusted laterally by loosening the plug 154 and swinging the bracket relative to the holder.

The slide lock assembly can be disposed on any suitable bracket or hanger upon which items or equipment are to be secured. For example, a slide lock assembly 100 is mounted on a hanger 170 in FIG. 1 which is suited for I.V. units.

It will be appreciated that one or more locking slides can be provided on different types of equipment or holders. For example, a locking slide can be provided at each end of a bumper guard 180 (FIG. 1) whereby one side can be mounted in one track at the front (or back) of the column, and the other slide can be mounted in the other track on that same side.

The holder 102 according to the present invention is suitable for use with any suitable type of track regardless of whether it is mounted on a column, wall, ceiling, floor, etc. That is, the utility of the holder is independent of the column.

It will be appreciated that a track arrangement according to the present invention enables various pieces of equipment to be quickly and conveniently inserted and removed. By providing tracks at all four corners of the column and extending each track for the height of the column, equipment can be mounted virtually wherever it is most accessible for use or remote (for temporary storage). To install a piece, it is merely necessary to insert the locking slide into an enlargement of the channel 90, whereupon the slide can be slid upwardly or downwardly to any appropriate elevation. The provision of tracks at all four corners enables horizontally extending elements having two sides to be mounted in two adjacent tracks. The locking slide enables the equipment to be locked or released for movement by the mere actuation of a threaded member.

The provision of a holder carrying a movable arm further enables the equipment to be adjusted in a horizontal direction, as well as in a vertical direction to the most appropriate location. The arm is held in its various positions of horizontal adjustment by means of the resilient engagement between the arm and the resilient tongue. Differently configured mounting arms can be substituted for that depicted by merely pulling the tongue from the socket and inserting the tongue of the new arm into the socket.

The channel enlargements of a given track are vertically spaced in accordance with the vertical spacing between the locking slides of a vertically oriented holder, such as a U-shaped member 190 (FIG. 1) for holding the sphygmomanometer 68. This enables the slides of that member to be simultaneously introduced into the track.

By forming the chases and outer panels of a nonflammable material, the need to shield the internal electric lines within metal tubes is eliminated, thus saving space, time, and cost.

Although the present invention has been described in connection with a preferred embodiment thereof, it will be appreciated by those skilled in the art that additions, modifications, substitutions, and deletions, not specifically described, may be made without departing from the spirit and scope of the invention, as defined in the appended claims.

What is claimed is:

1. A medical service column in combination with a member removably attached thereto, said column is free-standing and has front and rear sides with service outlets mounted on at least said front side for connection with fluid and electrical conduits, said column being positionable adjacent a corner of the head of a patient's bed to locate medical services proximate to the patient, said column including pairs of vertically extending tracks at the front and rear sides of the column, each track extending substantially the height of said column, said member including at least one locking slide configured to be connected to a track for vertical sliding movement therealong, and a manual actuator for locking said slide at selected vertical locations along said track, wherein said member comprises a holder having a rotatable arm mounted in a bore thereof for rotation about a vertical axis, resilient means for yieldably retaining said arm in various positions of horizontal adjustment, and means for expanding said resilient means radially outwardly into engagement with a wall of said bore.

2. A combination according to claim 1, wherein said member extends horizontally across one of said sides of said column and includes two locking sides arranged to be simultaneously received in said tracks on said side of said column.

3. A combination according to claim 1, wherein said member is vertically extending and includes vertically spaced slides receivable simultaneously in any of said tracks.

4. A combination according to claim 1, wherein said column comprises a pair of vertically extending pillars, a plurality of horizontally extending chases extending between said pillars, and decorative panels covering said chases, said tracks being disposed on said pillars.

5. The combination according to claim 1, wherein said member includes a base to which said slide is mounted, said slide formed of a low-friction non-metallic material, a screw interconnecting said base with said slide such that rotation of said screw moves said slide toward and away from said base, said slide being configured to slide within a channel of the track and being movable against a wall of said channel when said slide is drawn toward said base by said screw, wherein said slide comprises a hollow tube and rigid plate secured therein, said screw being connected to said plate.

6. The combination according to claim 1, further in combination with a mounting bracket having an annular member formed of resilient material said member including a cylindrical bore adapted to receive said annular member to enable said bracket to be rotated about a longitudinal axis of said bore, and means for expanding said annular member radially outwardly into frictional engagement with a wall of said bore to affix said bracket immovably to said member.

7. The combination according to claim 6, wherein said means for expanding comprises a threaded rod extending through said annular member, and a threaded nut mounted on said rod such that tightening of said nut expands said annular member radially outwardly.

8. The combination according to claim 1, wherein said sides comprise a plurality of horizontally extending chases for carrying service outlets, said chases formed entirely of non-flammable material to eliminate a need to enclose the electrical lines within metal conduits.

* * * * *